United States Patent
Pickett et al.

(10) Patent No.: US 9,904,290 B2
(45) Date of Patent: Feb. 27, 2018

(54) GEOMETRY-BASED MONITORING AND CONTROL OF COUPLED MOBILE MACHINES

(71) Applicant: Deere and Company, Moline, IL (US)

(72) Inventors: Terence D. Pickett, Waukee, IA (US); Noel W. Anderson, Fargo, ND (US); Bernard E. Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 204 days.

(21) Appl. No.: 14/690,461

(22) Filed: Apr. 19, 2015

(65) Prior Publication Data

US 2016/0306362 A1 Oct. 20, 2016

(51) Int. Cl.
*G05D 1/02* (2006.01)

(52) U.S. Cl.
CPC ... *G05D 1/0287* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 6,804,587 B1* | 10/2004 | O Connor | E02F 9/2045 342/357.31 |
| 6,966,388 B1* | 11/2005 | Harnetiaux | A01B 59/042 172/677 |
| 7,054,731 B1* | 5/2006 | Lange | A01B 69/008 172/4.5 |
| 7,142,956 B2* | 11/2006 | Heiniger | G05D 1/027 180/9.1 |
| 7,162,348 B2* | 1/2007 | McClure | A01B 69/004 280/456.1 |
| 7,330,776 B1* | 2/2008 | Norman | A63H 11/00 318/568.1 |
| 7,490,678 B2* | 2/2009 | Unruh | A01B 9/004 172/2 |
| 7,580,783 B2* | 8/2009 | Dix | G01C 21/005 342/357.36 |
| 7,844,378 B2* | 11/2010 | Lange | A01B 15/20 180/9.38 |
| 7,933,701 B2* | 4/2011 | Davis | B62D 12/00 172/663 |
| 8,116,977 B2* | 2/2012 | Aral | A01B 69/004 701/471 |
| 8,190,364 B2* | 5/2012 | Rekow | A01B 69/006 701/302 |
| 8,825,263 B1* | 9/2014 | Nelson, Jr. | G01C 21/362 701/25 |

(Continued)

*Primary Examiner* — Rami Khatib
*Assistant Examiner* — Nicholas K Wiltey
(74) *Attorney, Agent, or Firm* — Rathe Lindenbaum LLP

(57) ABSTRACT

Position data signals based upon sensing of coupled mobile machines in a position in which the coupled mobile machines have first orientations relative to one another are received. The receive position data signals are used to determine geometric information for the coupled mobile machines. Control signals are generated output based upon the determined geometric information for the coupled mobile machines, wherein the control signals facilitate monitoring and control of operation of the coupled mobile machines.

21 Claims, 5 Drawing Sheets

(56) References Cited

U.S. PATENT DOCUMENTS

| | | | |
|---|---|---|---|
| 8,924,099 B2* | 12/2014 | Nelson, Jr. | A01C 21/00 701/50 |
| 9,188,986 B2* | 11/2015 | Baumann | G05D 1/0289 |
| 9,232,688 B2* | 1/2016 | Kormann | A01B 69/005 |
| 9,374,939 B2* | 6/2016 | Pickett | A01B 69/008 |
| 9,380,738 B2* | 7/2016 | Nelson, Jr. | A01C 21/00 |
| 2002/0095251 A1* | 7/2002 | Oh | B60T 7/20 701/70 |
| 2003/0208311 A1* | 11/2003 | McClure | A01B 69/004 701/50 |
| 2004/0040772 A1* | 3/2004 | Ertl | B60R 21/01538 180/271 |
| 2004/0111202 A1* | 6/2004 | Mailer | A01B 69/004 701/50 |
| 2004/0186644 A1* | 9/2004 | McClure | A01B 69/008 701/50 |
| 2005/0015189 A1* | 1/2005 | Posselius | A01B 79/005 701/50 |
| 2005/0288834 A1* | 12/2005 | Heiniger | G05D 1/027 701/23 |
| 2006/0142936 A1* | 6/2006 | Dix | G01C 21/005 701/50 |
| 2006/0274149 A1* | 12/2006 | Yoshizawa | B60R 21/0134 348/148 |
| 2008/0004778 A1* | 1/2008 | Rekow | A01B 69/004 701/50 |
| 2008/0147282 A1* | 6/2008 | Kormann | A01B 69/003 701/50 |
| 2008/0228353 A1* | 9/2008 | Mayfield | A01B 69/008 701/41 |
| 2009/0326752 A1* | 12/2009 | Staempfle | G01S 13/931 701/31.4 |
| 2010/0063673 A1* | 3/2010 | Anderson | G05D 1/0287 701/29.2 |
| 2010/0066517 A1* | 3/2010 | Posselius | G01S 5/0247 340/435 |
| 2010/0256852 A1* | 10/2010 | Mudalige | G08G 1/163 701/24 |
| 2011/0112730 A1* | 5/2011 | Rekow | G05D 1/0219 701/50 |
| 2011/0125371 A1* | 5/2011 | Wang | A01L 369/006 701/42 |
| 2012/0095651 A1* | 4/2012 | Anderson | G05D 1/0274 701/50 |
| 2012/0200706 A1* | 8/2012 | Greenwood | B60R 1/00 348/148 |
| 2013/0103249 A1* | 4/2013 | Pieper | G05D 1/0214 701/25 |
| 2013/0168113 A1* | 7/2013 | Gustafson | A01B 59/066 172/1 |
| 2013/0173116 A1* | 7/2013 | Gustafson | A01B 69/004 701/41 |
| 2013/0186657 A1* | 7/2013 | Kormann | A01L 369/004 172/1 |
| 2014/0003889 A1* | 1/2014 | Van Bentzinger | A01D 90/02 414/111 |
| 2014/0136095 A1* | 5/2014 | Isogai | G01S 15/931 701/300 |
| 2014/0188346 A1* | 7/2014 | Lavoie | B62D 13/06 701/42 |
| 2014/0218506 A1* | 8/2014 | Trombley | B60R 1/003 348/113 |
| 2014/0249691 A1* | 9/2014 | Hafner | B62D 13/06 701/1 |
| 2014/0249723 A1* | 9/2014 | Pilutti | B62D 15/027 701/42 |
| 2014/0267688 A1* | 9/2014 | Aich | H04N 7/181 348/113 |
| 2014/0267689 A1* | 9/2014 | Lavoie | H04N 7/183 348/113 |
| 2014/0277899 A1* | 9/2014 | Matsuzaki | G05D 1/0287 701/25 |
| 2014/0277942 A1* | 9/2014 | Kyrtsos | G01B 21/02 701/41 |
| 2014/0297128 A1* | 10/2014 | Lavoie | G01B 21/06 701/41 |
| 2014/0297129 A1* | 10/2014 | Lavoie | B62D 13/06 701/41 |
| 2014/0303849 A1* | 10/2014 | Hafner | B62D 13/06 701/42 |
| 2014/0358412 A1* | 12/2014 | Fausten | G08G 1/164 701/117 |
| 2015/0045992 A1* | 2/2015 | Ashby | E02F 9/265 701/2 |
| 2015/0105965 A1* | 4/2015 | Blackwell | A01L 359/002 701/28 |
| 2015/0201546 A1* | 7/2015 | Muller | A01B 69/003 701/50 |
| 2015/0225923 A1* | 8/2015 | Wallace | E02F 3/847 701/50 |
| 2015/0251697 A1* | 9/2015 | Lavoie | B62D 13/06 701/523 |
| 2015/0309512 A1* | 10/2015 | Cudak | G05D 1/0287 701/23 |
| 2015/0319913 A1* | 11/2015 | Foster | A01B 69/00 701/26 |
| 2015/0346728 A1* | 12/2015 | Peake | G05D 1/0212 701/23 |
| 2015/0370255 A1* | 12/2015 | Harvey | B62D 15/0285 701/24 |
| 2016/0039456 A1* | 2/2016 | Lavoie | B62D 15/027 701/41 |
| 2016/0057921 A1* | 3/2016 | Pickett | A01B 69/008 701/23 |
| 2016/0266578 A1* | 9/2016 | Douglas | G05D 1/0225 |
| 2016/0306362 A1* | 10/2016 | Pickett | G05D 1/0287 |

\* cited by examiner

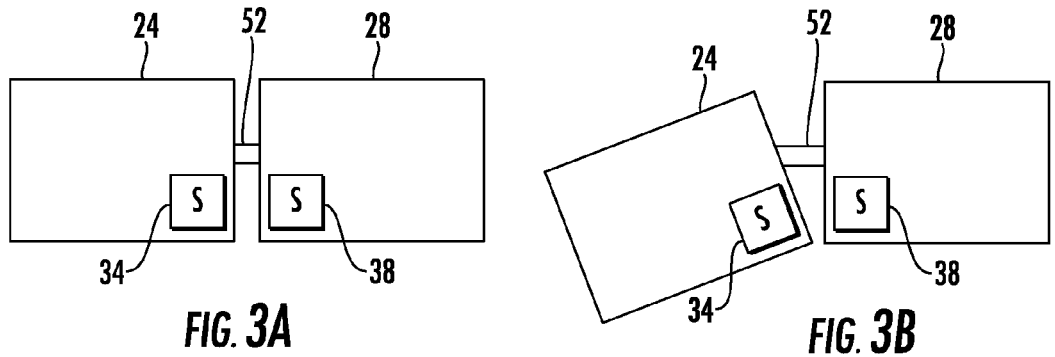
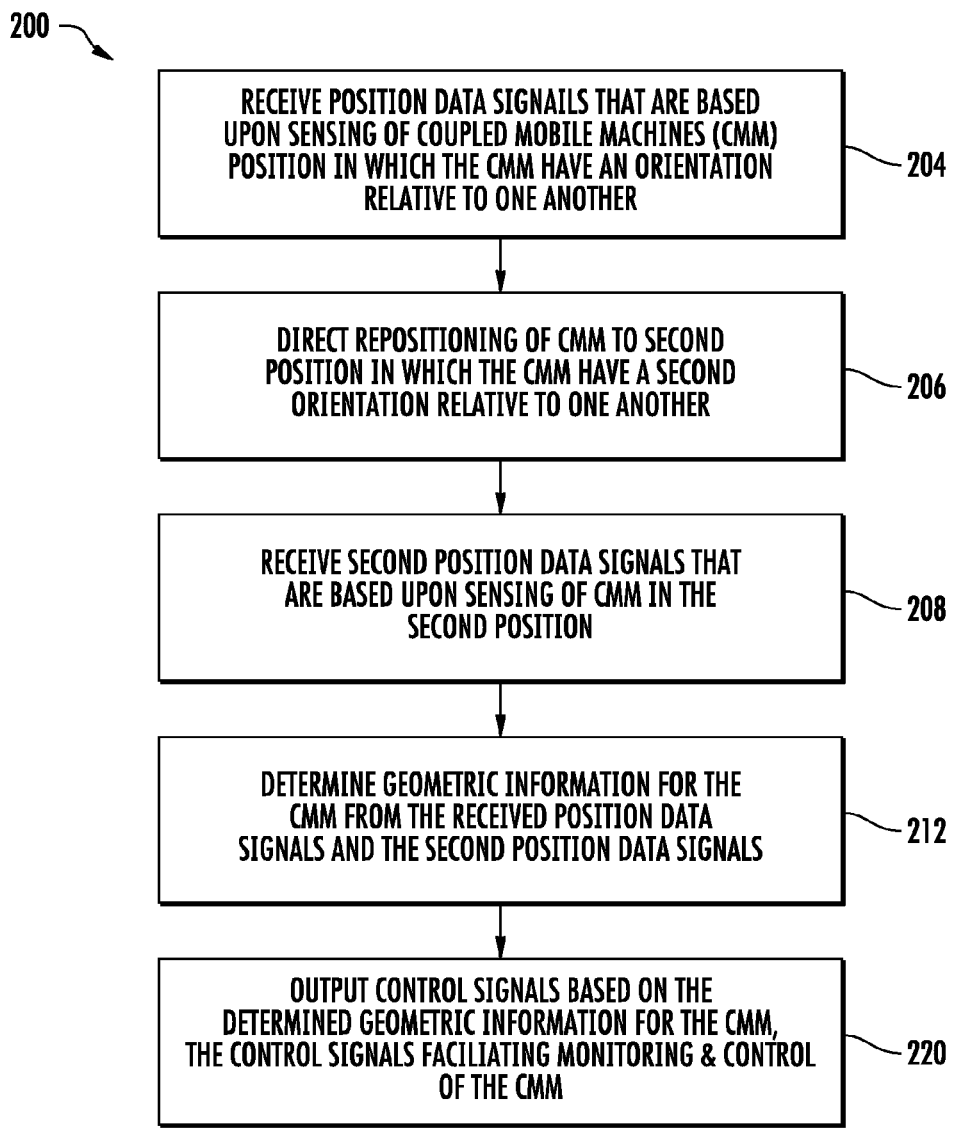

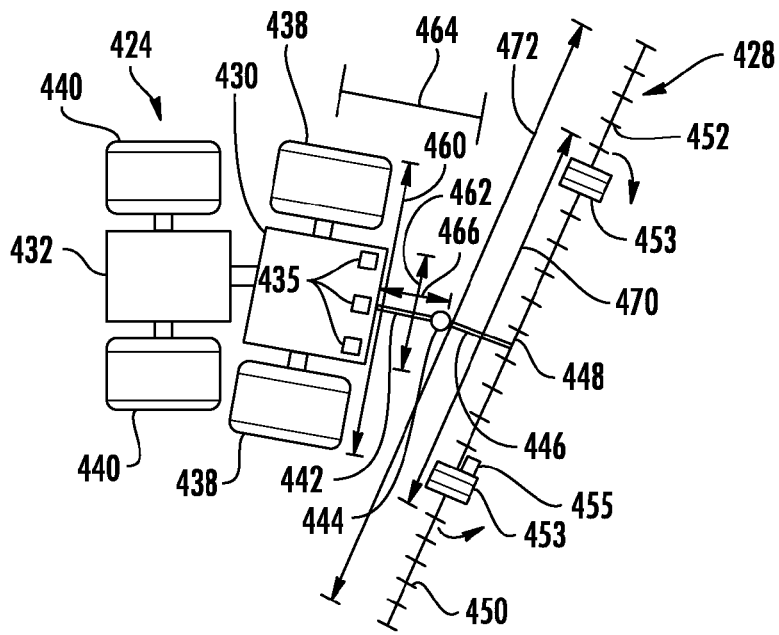
FIG. 6
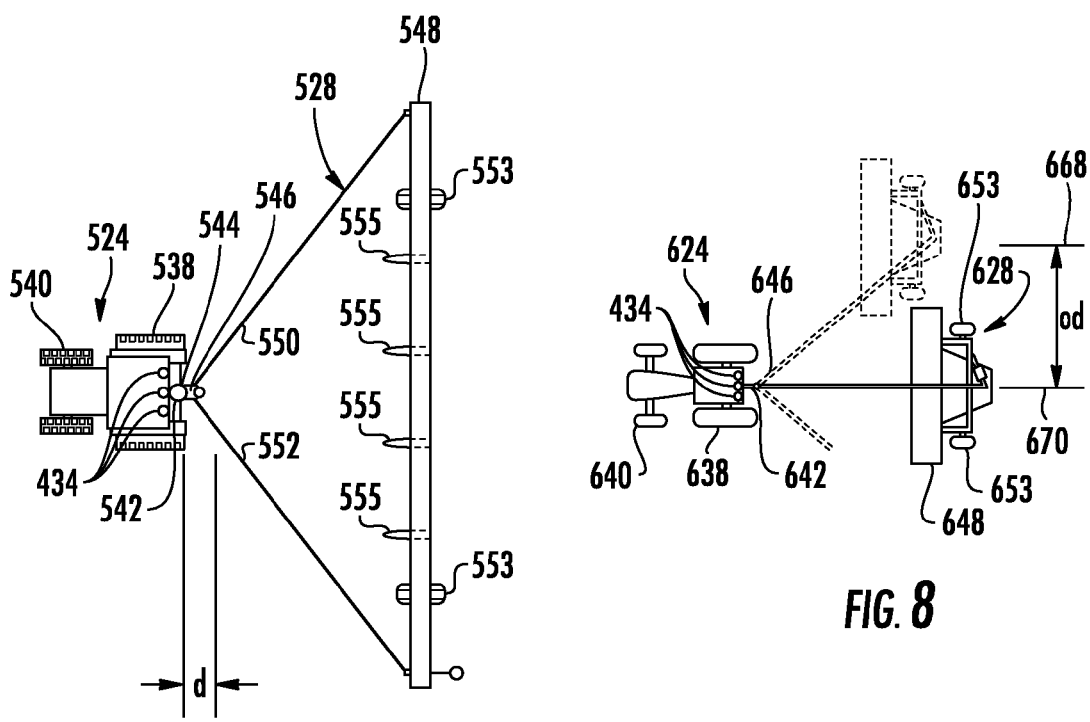
FIG. 7
FIG. 8

GEOMETRY-BASED MONITORING AND CONTROL OF COUPLED MOBILE MACHINES

BACKGROUND

In many circumstances, different mobile machines are coupled to one another. For example, a tractor is often hitched to a towed implement. Operation and interaction of the two different mobile machines may be dependent upon the differing geometries of the two mobile machines. As such geometries may change, reliable monitoring of the operation and interaction of the two mobile machines is sometimes difficult.

BRIEF DESCRIPTION OF THE DRAWINGS

FIGS. 3A and 3B are schematic diagrams illustrating different positions of coupled mobile machines when determining geometric information.

FIG. 4 is a flow diagram of another example method for geometry-based monitoring and control.

FIG. 6 is a top view schematically illustrating an example of coupled mobile machines and determined geometric information.

FIG. 7 is a top view schematically illustrating another example of coupled mobile machines and determined geometric information.

FIG. 8 is a top view schematically illustrating another example of coupled mobile machines and determined geometric information.

DETAILED DESCRIPTION OF EXAMPLES

Figure 1:
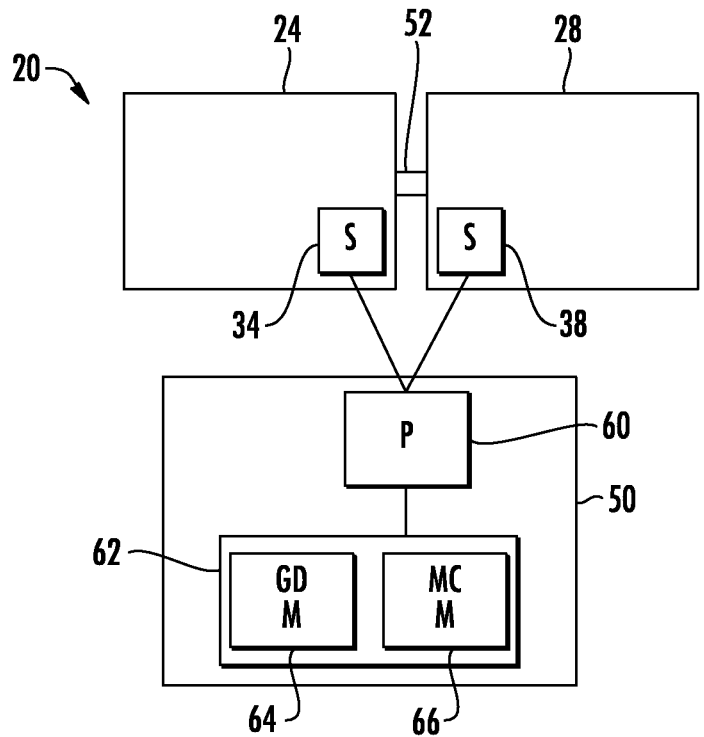
FIG. 1 is a schematic diagram of an example geometry based monitoring and control system.

FIG. 1 schematically illustrates an example geometry based monitoring and control system 20 for coupled mobile machines. As will be described hereafter, system 20 facilitates reliable monitoring of coupled mobile machines, different mobile machines that are connected to one another, by sensing the coupled mobile machines, determining current geometric information for the coupled mobile machines based upon the sensed data and outputting control signals based upon the determined geometric information, wherein the control signals facilitate monitoring of the coupled mobile machines. As shown by FIG. 1, system 20 comprises mobile machine 24, mobile machine 28, sensor 34, sensor 38 and controller 50.

Mobile machine 24 comprises a machine to traverse or travel while being connected to or coupled to one or more other mobile machines, such as mobile machine 28. Likewise, mobile machine 28 comprises a machine to traverse or travel while being connected to or coupled to one or more other mobile machines, such as mobile machine 24. In one implementation, one or both of mobile machines 24, 28 comprises one or more wheels to facilitate traveling or movement. In another implementation, one or both of mobile machines 24, 28 comprises tracks, skis or other ground engaging members that facilitate travel.

Mobile machines 24, 28 are coupled to one another by coupler 52. In one implementation, coupler 52 comprises a hitch, such as a drawbar, which pivotably connects machines 24, 28. In another implementation, coupler 52 comprises a multi-point hitch, such as a three-point hitch. In one implementation, coupler 52 facilitates relative movement of machines 24 and 28.

In one implementation, mobile machine 24 comprise a primary mover which tows or pulls mobile machine 28. For example, in one implementation, mobile machine 24 comprises a tractor which pulls mobile machine 28 in the form of an implement. Examples of implements include, but are not limited to, plows, discs, wagons, planters, cultivators, balers, and the like. In one implementation, mobile machine 28 may be a winged implement, wherein the operating width of the implement may change in response to raising or lowering of winged portions of the implement, such as wings supporting additional discs or other ground engaging tools. In yet other implementations, mobile machine 28 comprises a primary mover which pushes mobile machine 24. In some implementations, one of mobile machines 24, 28 is alternatively carried and suspended by the other of mobile machines 24, 28, rather than both of mobile machines 24 rolling or otherwise moving along the underlying terrain or ground.

Sensor 34, 38 comprise devices that sense information regarding the current state, size and positioning of various structures or components of machines 24, 28, while they are coupled to one another and that output position data signals based upon such sensing. For example, in one implementation, sensors 34, 38 sense and output signals which vary depending upon the number of tires or number of tracks currently being employed by machine 24 and/or machine 28 and/or the size and inflation state of the number of tires currently being employed by machine 24 and/or machine 28. In one implementation, sensor 34, 38 output signals which vary depending upon the state of either of machines 24, 28, such as whether machine 24 or machine 28 is articulated, pivoting about a vertical axis, and/or whether machine 24 or machine 28 has wings and whether such wings are retracted or extended. In the example illustrated, each of mobile machines 24, 28 carries a sensor. Mobile machine 24 carries sensor 34 while mobile machine 28 carries sensor 38. Although each of machines 24, 28 are illustrated as supporting and carrying a single sensor, in other implementations, machines 24, 28 each carry an array are multitude of the same sensors or of different sensors at different locations. In one implementation, only one of machines 24, 28 carries at least one sensor.

In one implementation, one or both of sensors 34, 38 capture images or three-dimensional data pertaining to the current configuration of coupled mobile machines 24, 28. In one implementation, sensor 34, 38 output signals representing at least one of a stereo image, a sequence of images, a lidar three-dimensional image or an ultrasonic three-dimensional image. In other implementations, one or both of sensors 34, 38 comprise other types of sensors which sense the current configuration of coupled mobile machines 24, 28. For example, in other implementations, sensors 34, 38 may comprise tire pressure sensors, ID sensors, magnetic sensors such as switch or Hall effect sensors, wing position sensors, and hydraulic pressure sensors, wherein pressure is indicating wing position and the like. Sensors 34, 38 transmit their generated signals to controller 50.

Controller 50 receive signals from sensor 34, 38 and utilizes such signals to determine geometric information regarding the configuration of the coupled or connected mobile machines 24, 28. Controller 50 then utilizes the determined geometric information to output control signals that further facilitate monitoring of the operations of the coupled mobile machines 24, 28. As schematically shown by FIG. 1, controller 50 comprises processor 60 and non-transitory or non-transient computer-readable medium 62 containing geometry determination module 64 and monitoring control module 66.

Processor 60 comprises a processing unit that carries out or follows instructions provided by module 64 and 66 stored in memory 62. For purposes of this application, the term "processing unit" shall mean a presently developed or future developed processing unit that executes sequences of instructions contained in a memory, such as memory 62. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 50 may be embodied as part of one or more application-specific integrated circuits (ASICs). Unless otherwise specifically noted, the controller is not limited to any specific combination of hardware circuitry and software, nor to any particular source for the instructions executed by the processing unit. Moreover, such processing units forming processor 60 or controller 50 may be part of a distributed computing architecture, such as where controller 50 is provided by multiple processing units distributed amongst multiple machines partially or fully located at a remote location in wireless communication with mobile machine 24.

Figure 2:
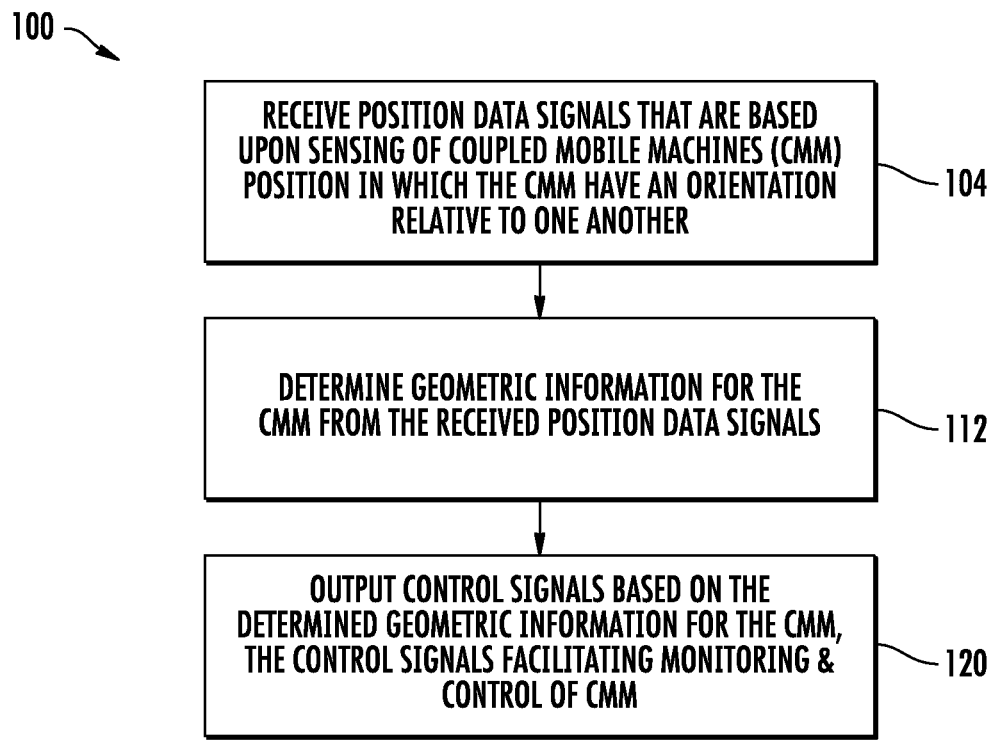
FIG. 2 is a flow diagram of an example method for geometry-based monitoring and control.

Modules 64, 66 comprise computer-readable instructions, such as programmed logic, software, or code, stored in memory 62. Modules 64 and 66 direct processor 60 to carry out the example method 100 outlined in FIG. 2. As indicated by block 104, module 64 directs processor 60 to receive position data signals from one or both of sensors 34, 38, wherein such position data signals are based upon the sensing of the coupled mobile machines 24, 28 in a particular position in which the coupled mobile machines 24, 28 have a current orientation or state. In one implementation, signals from sensor 34, 38 are continuously streamed to processor 60. In yet another implementation come processor 60 polls sensors 34, 38 at predetermined times or at a predetermined frequency.

As indicated by block 112, module 64 instructs or directs processor 60 to determine geometric information for the present configuration of coupled mobile machines 24, 28 based upon or from the received position data signals per block 104. For example, in one implementation, such signals may represent an image or three-dimensional data, wherein processor 60 analyzes such images or three-dimensional data to determine geometric information such as the size of certain structures, such as the tires, the length of a hitch, the state of a hitch, the spacing, orientation or angle of the connection between the two mobile machines 24, 28, whether or not a winged element is extended or retracted, the spacing between different members or structures of an individual mobile machine, 24, 28 and/or the spacing between different members or structures of the two different mobile machines 24, 28. The determined geometric information is stored for such retrieval and use.

As indicated by block 120, monitoring control module 66 directs processor 60 to output control signals based on the determined geometric information for the coupled mobile machines 24, 28. The control signals facilitate monitoring and control of operation of the coupled mobile machines 24, 28. For example, in one implementation, monitoring control module 66 determines contact points of the coupled mobile machines based upon the determined geometric information for the coupled mobile machines 24, 28. In one implementation, such contact points constitute points of machines 24, 28 that may come into contact with one another as vehicles 24, 28 are moved to various positions or orientations relative to one another. In such an implementation, monitoring control module 66 directs processor 62 monitor a distance between such determine contact points. Monitoring control module 66 further directs processor 60 to output control signals in response to a sensed distance between the contact points being less than a predefined buffer distance. Such control signals initiate an action such as outputting a notification to an onboard operator of the coupled machines 24, 28, imposing a steering limitation upon the coupled mobile machines 24, 28 and/or stopping travel of the coupled mobile machines 24, 28.

In yet another implementation, the determined geometric information for the coupled mobile machines 24, 28 is utilized as a basis for outputting control signals that suggests a particular path for the coupled machines 24, 28 to a human operator of coupled mobile machines 24, 28 or that directly control the path being taken by coupled mobile machines 24, 28. In some implementations, coupled mobile machines 24, 28 are unmanned. In other implementations, are supervised by human, but otherwise running autonomously or are fully autonomous. For example, in one implementation, the determined geometric information for coupled mobile machines 24, 28 may impact soil compaction by mobile machines 24, 28. Based upon such determine geometric information, monitoring control module 66 adjusts the path being taken to lessen soil compaction.

In yet another implementation, the determined geometric information for the coupled mobile machines 24, 28 is utilized by controller 50 in determining which of sensors 34, 38, or other sensors, are used to monitor operation of coupled mobile machines 24, 28. For example, in one implementation, based upon the determined geometry, monitoring control module 66 directs processor 60 to output control signals which activate certain ones of sensors and disables other certain ones of sensors on coupled mobile machines 24, 28. In one implementation, based upon the determined geometry, monitoring control module 66 directs processor 60 to output control signals which result in data from different sensors being differently weighted in their use for monitoring and control of the operations of couple mobile machines 24, 28.

FIGS. 3A, 3B and 4 illustrate another example method 200 for the control and monitoring of coupled mobile machines. As indicated by block 204, controller 50 (shown in FIG. 1) receives position data signals that are based upon sensing of a position of coupled mobile machines 24, 28 in which the couple mobile machines 24, 28 have a first orientation relative to one another. For example, in one implementation, processor 60 receive data signals from sensor 34, 38 while mobile machines 24, 28 are in the first position shown in FIG. 3A. In some circumstances, sensing mobile machines 24, 28 in a single position or orientation relative to one another may not produce reliable geometric information.

As indicated by block 206, controller 50 redirects the positioning of the coupled mobile machines 24, 28 to a second position in which the coupled mobile machines 24, 28 have a second orientation relative to one another. For example, controller 50 may direct repositioning of mobile machines 24, 28 to the alternative position shown in FIG. 3B in which mobile machines 24, 28 are angled with respect to one another rather than being aligned with one another. In one implementation, controller 50 redirects the positioning of coupled mobile machines 24, 28 by outputting control signals instructing a human operator to adjust or reposition mobile machines 24, 28. In one implementation, controller 50 may instruct a human onboard operator of one of machines 24, 28. In another implementation, controller 50 may instruct a human operator who is controlling mobile machines 24, 28 remotely. In one implementation, such instruction may be carried out through the output of control signals that cause a display to present a graphic depicting the current position or orientation of mobile machines 24, 28 and the new position or orientation to which mobile machines 24, 28 are to be moved. In one implementation, the graphic may depict the current position or orientation of mobile machines 24, 28 as they are being repositioned relative to one another, wherein a further notification is output informing the operator when the desired new position orientation has been attained. For example, when mobile machines 24, 28 have been moved to the next selected position or orientation, the color of the graphic representing mobile machines 24, 28 on a display monitor may change, the graphic may begin to flash or an audible indicator may sound.

In yet another implementation, controller 50 outputs control signals that control the steering of at least one of mobile machines 24, 28 to automatically move coupled mobile machines 24, 28 to the desired position for capturing additional position data signals to determine geometric information. In still another implementation, controller 50 outputs control signals either instructing an operator to move coupled mobile machines 24, 28 through a requested range of motion that encompasses one or more positions at which position data is to be acquired or automatically controlling the steering of mobile machines 24, 28 to move through the requested range of motion. As the coupled mobile machines 24, 28 are moved through the range of motion, controller 50 monitors such movement. At the point or points in time during such movement at which coupled mobile machines 24, 28 are at desired position or orientation, controller 50 automatically captures and receives the position data signals from sensor 34, 38. In some implementations, controller 50 captures or receives position data signals throughout the entire range, wherein all of such data is utilized to determine geometric information for the coupled mobile machines 24, 28.

As indicated by block 208, while coupled mobile machines 24, 28 are at the second position or second orientation relative to one another, different than the first position or first orientation, controller 50 receives the second position data signals. As indicated by block 212, geometry determination module 64 directs processor 60 to determine geometric information for the coupled mobile machines 24, 28 from both the position data signals that were received when coupled mobile machines 24, 28 were in the first position and when coupled mobile machines 24, 28 were in the second position.

As indicated by block 220, monitor control module 66 utilizes the determine geometric information to output control signals for the coupled mobile machines 24, 28, the control signals facilitate monitoring and control of operations of mobile machines 24, 28.

Figure 5:
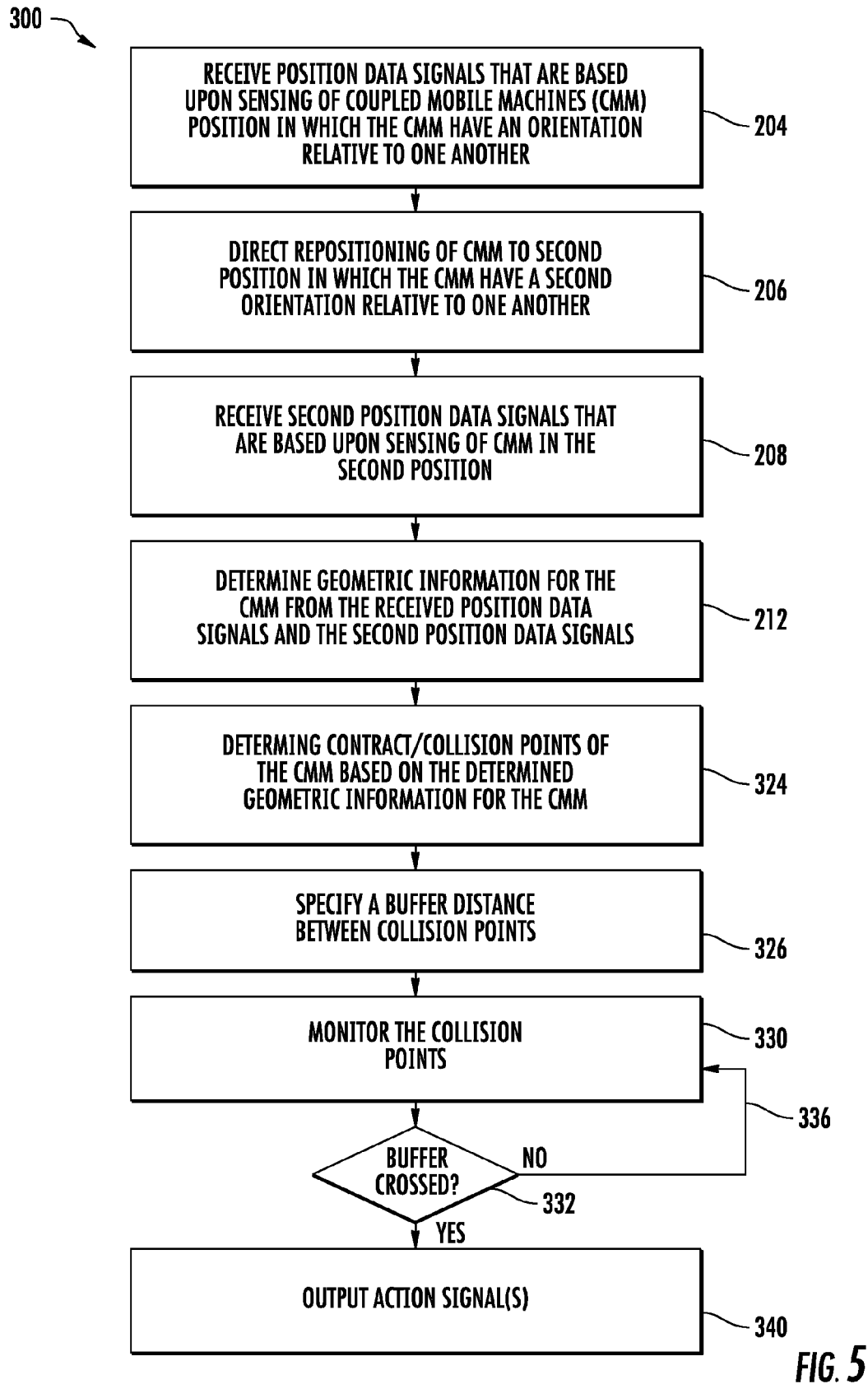
FIG. 5 is a flow diagram of another example method for geometry-based monitoring and control.

FIG. 5 is a flow diagram of another example method 300 that, in one implementation, is carried out by system 20. Method 300 is similar to method 200 except that method 300 additionally utilizes the geometric information to monitor and control coupled mobile machines 24, 28 to reduce a likelihood of collisions. Those actions or blocks in method 300 that correspond to actions or blocks in method 200 are numbered similarly.

As indicated by block 324, once the geometric information for the coupled mobile machines 24, 28 has been determined from the received position data signals, monitor control module 66 directs processor 60 to determine or identify contact/collision points of the coupled mobile machines 24, 28 based on the determine geometric information for the coupled mobile machines 24, 28. In one implementation, such contact/collision points constitute points or locations on machines 24, 28 that may come into contact with one another as vehicles 24, 28 are moved to various positions or orientations relative to one another.

As indicated by block 326, controller 50 specifies a buffer distance between the identified or determined contact/collision points. In one implementation, this buffer represents a safe margin of error or tolerance level with respect to the proximity of a contact point on mobile machine 24 and its corresponding or associated contact point on mobile machine 28. In one implementation, controller 50 prompts the operator to input, via keyboard, touchscreen or the like, a selected buffer distance for each pair of contact points, wherein the inputted buffer distance is stored for future use. In another implementation, different buffer distances for different contact points may be preset by a manufacture of one or both of mobile machines 24, 28. In one implementation, the buffer distance for each pair of contact points of the different mobile machines 24, 28 is calculated by controller 50 based upon various factors such as a degree of harm which result from possible collision, the estimated reaction time for a human operator as the corresponding contact points are moving closer to one another, the estimated reaction time for controller 50 to react as the corresponding contact points are moving closer to one another, as well as the current rate at which the corresponding contact points are moving closer to one another. For example, in one implementation, controller 50 automatically and dynamically determines a buffer distance based upon actual ongoing sensed values or received values. For example, in one implementation, upon receiving signals indicating that mobile machines 24, 28 are currently moving at a first speed or rate, controller 50 will determine and output a first buffer distance for a first pair of corresponding contact points on mobile machines 24, 28. By way of contrast, upon receiving signals indicating that mobile machines 24, 28 are currently moving at a second speed or rate, greater than the first speed or rate, controller 50 will determine and output a second buffer distance, less than the first buffer distance, for the same pair of corresponding contact points on mobile machines 24, 28.

In one implementation, controller 50 will additionally adjust the determined buffer distance based upon signals indicating an ongoing or current environmental condition. For example, upon receiving signals of environmental conditions that may present low visibility to an operator, such as poor lighting, airborne dust and debris or the like, controller 50 will increase the buffer distance. In yet other implementations, controller 50 utilizes other factors to automatically and dynamically adjust the buffer distance for pairs of corresponding contact points on the different mobile machines 24, 28.

As indicated by block 330, controller 50 monitors the identified collision points on mobile machines 24, 28. As indicated by decision block 332, controller 50 compares the current position of the corresponding collision points to determine the current distance spacing such pairs of collision points. Controller 50 compares the determined distance spacing such pairs of collision points to the buffer's specified in block 326. As indicated by arrow 336, if the determined distance spacing such pairs of collision points does not exceed the buffer identified in block 326 for the pair of collision points, controller 50 continues to monitor such collision points. However, as indicated by block 340, upon determining that the buffer or buffer distance has been violated, the determined distance spacing are separating the pair of collision points is less than the buffer distance, controller 50 outputs one or more action control signals. Such control signals initiate an action such as outputting a notification to an onboard operator of the coupled machines 24, 28, imposing a steering limitation upon the coupled mobile machines 24, 28 and/or stopping travel of the coupled mobile machines 24, 28.

FIG. 6 schematically illustrates various examples of geometric information determined by controller 50 for particular coupled mobile machines 424, 428. In the example illustrated, mobile machine 424 comprises an articulating tractor while mobile machine 428 comprises a towed or pulled implement. Mobile machine 424 comprises a rear chassis or frame 430 which articulates relative to a front chassis or frame 432. Rear frame 430 includes tire sets 438 while front frame 432 includes tire sets 440. Rear frame 430 additionally includes a hitch 442 which is coupled or connected to implement 428 at a hitch point 444.

Implement 428 includes a hitch 446 which is connected to a main or central implement portion 448 and a pair of wings 450, 452. Central portion 448 is supported above the ground by one or more wheels 453. Wings 450, 452 extends from central portion 448 and move relative to central portion 448 between an extended position and a retracted position. In the extended position, wings 450, 452 result in implement 428 having a greater transverse width. In the retracted position, wings 450, 452 result in implement 428 having a reduced transverse width. In one implementation, wings 450, 452 pivot about a horizontal pivot axis between the extended and retracted positions. In another implementation, wings 450, 452 pivot about a vertical axis between the extended and retracted positions. In one implementation, mobile machine 428 omits such wings 450, 452. Examples of implement 428 include, but are not limited to, discs, plows, cultivators, planters or other implements.

In the example illustrated in FIG. 6, rear frame portion 430 carries multiple sensors 434. In one implementation, sensors 434 comprise sensors that capture image or three-dimensional data regarding mobile machine 428 as well as selected portions of mobile machine 424. In other implementations, sensors 434 comprise other types of sensing devices that are able to perceive structural components and positioning of mobile machines 424, 428. In one implementation, sensor 34, 38 output signals representing at least one of a stereo image, a sequence of images, a lidar three-dimensional image or an ultrasonic three-dimensional image.

As shown by FIG. 6, in one implementation, controller 50 utilizes the signals received from sensors 434 to determine geometric information such as actual length 460, frame width 462, axle to hitch point spacing 464, and frame to hitch point spacing 466. In one implementation, controller 50 additionally or alternatively utilizes the signals received from sensors 434 to determine the present transverse width 470 of the primary or central portion 448 of mobile machine 428, such as when wings 450, 452 are retracted, and the transverse width of 472 of mobile machine 428 when wings 450, 452 are extended, or when the only one of wings 450, 452 is extended. In some implementations, controller 50 (shown in FIG. 1) utilizes the signals received from sensors 434 to not only determine the state or condition of mobile machine 428 being pulled by mobile machine 424, such as the state of wings 450, 452, but to also identify the state or condition of mobile machine 424 itself. For example, controller 50 determines the number of tires in each of sets 438, 440 and their resulting width and/or resulting longitudinal length such as the extent to which sets 438 extend rearward of rear frame 430. In one implementation, controller 50 determines the position of the axle of the implement, such as through tires 453, as well as the angle of the implement tongue. Determining the position of the axle and the angle of implement tongue assists in automated backup and achieving squared off corners rather than rounded corners. In other implementations, controller 50 utilizes signals from sensors 434 to identify or determine other geometric information pertaining to coupled mobile machines 424, 428.

FIG. 7 schematically illustrates various examples of geometric information determined by controller 50 for particular coupled mobile machines 524, 528. In the example illustrated, mobile machine 524 comprises a tractor while mobile machine 528 comprises a towed or pulled A-frame implement. Mobile machine 524 includes rear tires 538, front tires 540 and a hitch 542 which is coupled or connected to implement 528 at a hitch point 544.

Implement 528 includes a hitch 546 which is connected to a main or central implement portion 548 by a pair of wings 550, 552. Central portion 548 is supported above the ground by one or more wheels 553. Central portion 548 supports various ground engaging tools 555 that engage the ground for cultivation, planting, or material application such as with the application of fertilization, herbicide or insecticide.

In the example illustrated in FIG. 7, the tractor of machine 524 carries multiple sensors 434, described above. In one implementation, sensors 434 comprise sensors that capture image or three-dimensional data regarding mobile machine 528 as well as selected portions of mobile machine 524. In other implementations, sensors 534 comprise other types of sensing devices that are able to perceive structural components and positioning of mobile machines 524, 528. In one implementation, sensors 434 output signals representing at least one of a stereo image, a sequence of images, a lidar three-dimensional image or an ultrasonic three-dimensional image. In one implementation, controller 50 utilizes the signals received from sensors 434 to determine geometric information such as the geometric information described above with respect to FIG. 6 as well as the distance d separating each of the rear tires 538 from the A-frame wings 550, 552.

FIG. 8 schematically illustrates various examples of geometric information determined by controller 50 for particular coupled mobile machines 624, 628. In the example illustrated, mobile machine 624 comprises a tractor while mobile machine 628 comprises an implement having an offset hitch 646 by which the implement may be offset from the in-line position shown in solid lines to a first offset position shown in broken lines or a second opposite offset position. Mobile machine 524 includes rear tires 638, front tires 640 and a hitch 642 which is coupled or connected to implement 528 at a hitch point 544.

Implement 628 is connected to a main or central implement portion 648. Central portion 648 is supported above the ground by one or more wheels 653. Central portion 548 supports various ground engaging tools that engage the ground for cultivation, planting, or material application such as with the application of fertilization, herbicide or insecticide.

In the example illustrated in FIG. 8, the tractor of machine 624 carries multiple sensors 434, described above. In one implementation, sensors 434 comprise sensors that capture image or three-dimensional data regarding mobile machine 628 as well as selected portions of mobile machine 624. In other implementations, sensors 434 comprise other types of sensing devices that are able to perceive structural components and positioning of mobile machines 624, 528. In one implementation, sensors 434 output signals representing at least one of a stereo image, a sequence of images, a lidar three-dimensional image or an ultrasonic three-dimensional image. In one implementation, controller 50 utilizes the signals received from sensors 434 to determine geometric information such as the geometric information described above with respect to FIG. 6 as well as the offset distance od by which the centerline of the mobile machine 668 is offset from the centerline 670 of mobile machine 624.

Figure 9:
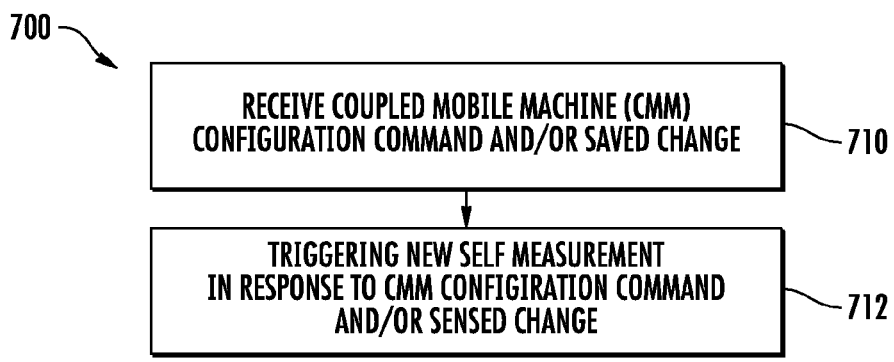
FIG. 9 is a flow diagram of an example method for triggering geometry-based monitoring and control.

FIG. 9 illustrates an example method 700 for triggering the capture of position data and the determination/calculation of geometric information for coupled mobile machines. As indicated by block 710, controller 50 receives a coupled mobile machine configuration command. Such a command directs a change in the configuration of one or both of coupled mobile machines 24, 28, 424, 428, 524, 528, 624, 628. For example, in one implementation, the sick coupled mobile machine configuration command direct wings 450, 452 of coupled mobile machine 428 to raise or lower. In another implementation, such coupled mobile machine configuration commands direct, mobile machine 628 to move from a line position to an offset position or vice versa.

As indicated by block 712, in response to receiving such coupled configuration commands, controller 50 automatically triggers a new self-measurement. In one implementation, controller 50 automatically carries out method 100 discarded above with respect to FIG. 2 in response to receiving a coupled mobile machine configuration command. In one implementation, the initiation of the new self-measurement is delayed by a predetermined amount of time to allow the configuration change to be implemented prior to the new self-measurement.

As indicated by block 710, some implementations, the triggering of the new self-measurement is additionally or alternatively based upon a sensed change in the configuration of one or both of the coupled mobile machines. For example, one or more sensors 455 on machine 428 sense the raising and lowering of wings 450, 452 of mobile machine 428. In one such implementation, sensors 455 output signals which trigger a new self-measurement.

Figure 10:
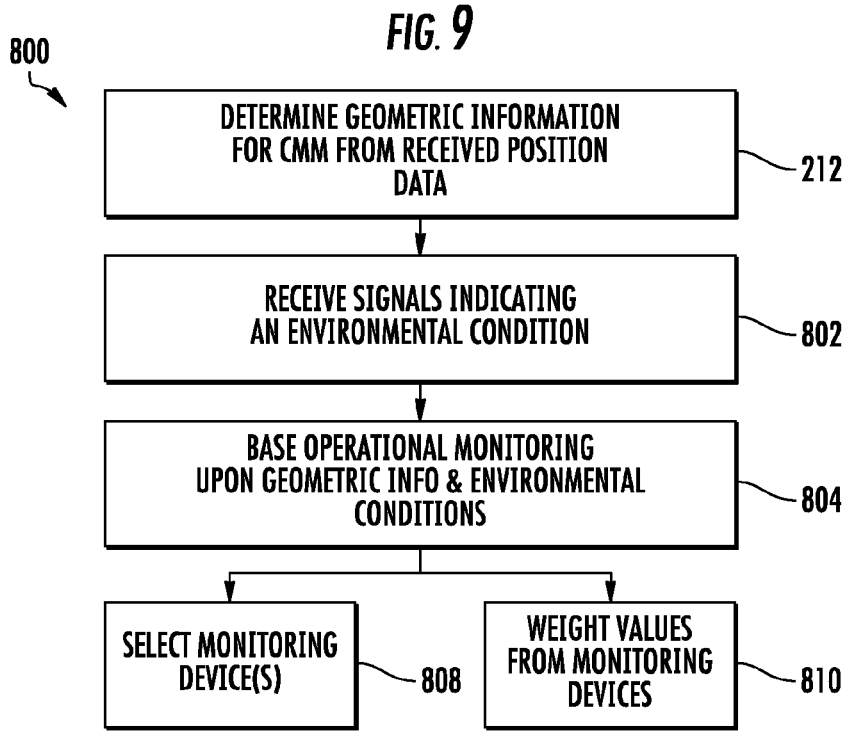
FIG. 10 is a flow diagram of another example method for geometry-based monitoring and control.
Figure 11:
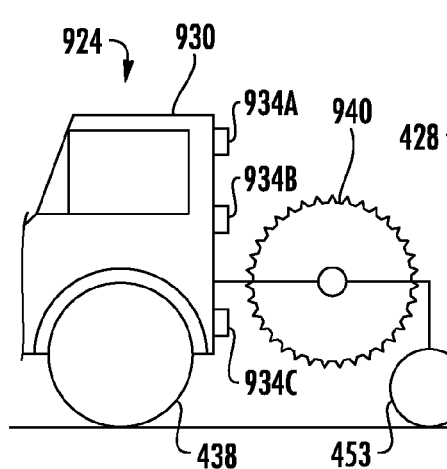
FIG. 11 is a fragmentary side view of an example of coupled mobile machines and an example environmental condition.

FIG. 10 illustrates an example method 800 that, in one implementation, is carried out by controller 50 (shown in FIG. 1) to adjust or control monitoring. As indicated by block 212, controller 50 determines geometric information for coupled mobile machines from received position data. FIG. 11 illustrates an example pair of coupled mobile machines 924, 428 for which geometric information is determined. As shown by FIG. 11, mobile machine 924 is coupled or connected to mobile machine 428 at a hitch point 444. Mobile machine 924 comprises a multitude of monitoring devices, such as a grid or array of monitoring devices 934A, 934B and 934C (collectively referred to as monitoring devices 934). Monitoring devices 934 comprise sensors that monitor operation of mobile machine 428, its interact with mobile machine 524 and its interaction with the ground or crops. In one implementation, monitoring devices 534 additionally provide the position data signals from which geometric information for coupled mobile machines 924, 428 is determined. In one implementation, each of monitoring devices 934 comprise a same type of monitoring device, but at different locations. In one implementation, monitoring devices 934 are arranged a different vertical heights as shown in FIG. 11. In another implementation, monitoring devices 934 are additionally or alternatively arranged at different transverse locations along frame 430. In some implementations, one or more of monitoring devices 934 comprise different types of monitoring devices or the same type of monitoring devices, but with different performance or resolution characteristics. In one implementation, monitoring devices 934 output signals representing at least one of a stereo image, a sequence of images, a lidar three-dimensional image or an ultrasonic three-dimensional image.

As indicated by block 802 in FIG. 8, controller 50 (shown in FIG. 1) receives signals indicating environmental condition. In one implementation, controller 50 prompts the operator of coupled mobile machines 924, 428 to input or identify various environmental conditions that may be present. In another implementation, controller 50 retrieves environmental information from one or more remote sources, such as across a local area network or a wide area network. For example, in one implementation, controller 50 retrieves environmental information or environmental conditions from weather data sources on the Internet. In yet another implementation, controller 50 receives such environmental condition indicating signals from one or more monitoring devices, such as from monitoring devices 934 or from other monitoring devices carried by one or both of coupled mobile machines 924, 428.

In one implementation, the signals indicating environmental conditions that are received by controller 50 are used by controller 50 to determine actual environmental conditions. Such signals may include, but are not limited to, wind speed, temperature, and current soil moisture. For example, in one implementation, controller 50 will automatically determine that a combination of high wind speed, high temperatures and dry soil conditions are likely to produce dusty conditions. In such an implementation, controller 50 will compare the values for current wind speed, temperature and soil moisture against predefined thresholds or apply predetermined formula to such values to determine whether such values are likely to produce dusty conditions.

In other implementations, the signals received by controller 50 directly indicate the current environmental condition. For example, cameras or other devices capturing images may directly indicate a dusty condition. In one implementation, such cameras or other monitoring devices may identify environmental conditions such as existing crop height or crop density. The environmental conditions indicated directly or indirectly by such signals impact the ability of the monitoring devices 934, of different types or at different locations, to reliably monitor the operation of coupled mobile machines 924, 428. For example, show by FIG. 11, dust 940 may extend between monitoring devices 934 and mobile machine 428, impairing the ability of certain ones of monitoring devices 934 to reliably or accurately monitor operations of mobile machine 428.

As indicated by block 804, controller 50 bases or controls the operational monitoring upon a combination of the determined geometric information and the environmental conditions. For example, in one implementation, if the signals being received by controller 50 that indicate environment conditions indicate a dusty condition, controller 50 will base how it monitors, mobile machine 524, 428 using senses 534 upon both the determined geometric information for coupled mobile machines 524, 428 and the identified environmental conditions.

Blocks 808 and 810 in FIG. 8 identified two user selectable modes of operation that may be carried out by controller 50 when adjusting how coupled mobile machine 924, 428 are monitored based upon the determined geometric information and the identified environmental condition. As indicated by block 808, in one mode of operation, controller 50 automatically selects which of the plurality of available monitoring devices 934 are used in the current environmental conditions and with the current determined geometry of the coupled mobile machines 924, 428 for monitoring. For example, in dusty conditions such as shown in FIG. 11, controller 50 determines that given the height of mobile machine 924, the height of mobile machine 428, the location of hitch point 444 and the distance basing coupled mobile machines 924, 428, controller 50 determines that monitoring devices 934B and 934C may be impaired by such dusty conditions such as dust 940, while monitoring device 934A is located above such dusty conditions. In such a scenario, controller 50 will select monitoring device 934A, as well as other monitoring devices at similar heights, for monitoring coupled mobile machine 428.

In one implementation, in circumstances where monitoring devices 934 comprise different types of sensing devices, controller 50 additionally takes into account the abilities of the different types of monitoring devices in combination with the determined geometric information and the environmental conditions. For example, monitoring device 934B may be of a type that is better suited to operate in dusty conditions as compared to the other types of monitoring devices. In such a situation, controller 50 selects monitoring device 934B over monitoring device 934A, despite the better location of monitoring device 934A or in addition to monitoring device 934A for the monitoring of mobile machine 428. In one circumstance, monitoring device 934C may be best suited for operating in the current environmental conditions, such as in a dusty condition. In such a situation, in one implementation, controller 50 will select monitoring device 934C for monitoring mobile machine 428 despite its poor location relative to the dust 940 and mobile machine 428. Because controller 50 selects just a portion of the available monitoring devices 934 for monitoring, noise or aberrational signals and computing bandwidth consumption are reduced.

As indicated by block 510, in another implementation, rather than culling out the use of certain monitoring devices based upon environmental conditions, the determined geometric information and/or the capabilities of the individual monitoring devices, controller 50 differently weights the signals or values received from the different monitoring devices 934 during monitoring of coupled mobile machines 924, 428. For example, signals or data received from those of monitoring devices 934 that are of the type best suited for sensing in the current environmental conditions and that are at locations best suited for sensing in the current environmental conditions given the current geometries of coupled mobile machines 924, 428 are given the greatest weighting by controller 50 when evaluating operation of machines 924, 428. Signals or data received from those of monitoring devices 934 that are of the type less suited for sensing in the current environmental conditions, but which are at locations best suited for sensing in the current environmental conditions given the current geometries of coupled mobile machines 924, 428 are given the next greatest weighting by controller 50 when evaluating operation of machines 924, 428. Signals or data received from those of monitoring devices 934 that are of the type not well suited for sensing in the current environmental conditions and that are not at locations best suited for sensing in the current environmental conditions given the current geometries of coupled mobile machines 924, 428 are given the lowest or least weighting by controller 50 when evaluating operation of machines 924, 428.

In one implementation, to determine which of monitoring devices 934 to select for monitoring or to determine how to weight the value of the signals received from the different monitoring devices 934, controller 50 consults a lookup table locally stored in memory 62 or consults a remote lookup table wirelessly. In one implementation, the lookup table indicates what weights or what selectors are to be used given different combinations of geometries, monitoring device types, monitoring device locations and environmental conditions. In another implementation's, formulas are utilized to select particular monitoring devices or traditionally weight signals from different sensors.

Although the example illustrated in FIG. 10 depicts controller 50 utilizing environmental conditions as part of his determination of what sensors 934 are to be used for monitoring or how the information from the different sensors 934 is to be weighted, in other implementations, block 802 is omitted. In particular, in other implementations, controller 50 selects from the available monitoring devices or differently weights values received from the different monitoring devices based upon the determined geometric information and the particular performance capabilities of the different monitoring devices 934. For example, given a particular set of geometric information, such as the determined size, shape, operational state or orientation of mobile machine 428, controller 50 selects, based upon location of the monitoring devices and/or their monitoring capabilities, different ones of monitoring devices 934 or differently weights the data from different monitoring devices 934 when monitoring operation of coupled mobile machines 924, 428.

In one implementation, controller 50 performs the selection of what monitoring devices 934 are to be used or assigns the different weights to be applied to the signals from the different monitoring devices 934 at an initial setup point immediately prior to use of coupled mobile machines 924, 428. In another implementation, controller 50 performs the selection of what monitoring devices 934 are to be used or assigns the different weights to be applied to the signals from the different monitoring devices 934 continuously during operation of coupled mobile machines 924, 428 or at predetermined periodic time intervals during the operation of coupled mobile machine 924, 428. In yet another implementation, controller 50 adjusts or changes what monitoring devices 934 are being used or what weights are being applied to the values from the different monitoring devices 934 in response to a triggering input from an operator of coupled mobile machines 924, 428.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   receiving position data signals that are based upon sensing of coupled mobile machines in a first position in which the coupled mobile machines have first orientations relative to one another;
   determining geometric information for the coupled mobile machines from the received position data signals, wherein the geometric information comprises at least one geometric determination selected from a group of geometric determinations consisting of: an axle length; a frame width; a distance between an axle and a hitch point a distance between an outermost rear tire and an A-frame; and an offset distance of an offset hitch; and
   outputting control signals based upon the determined geometric information for the coupled mobile machines.

2. The method of claim 1 further comprising receiving a coupled machine configuration command to change a configuration of at least one of the coupled mobile machines, wherein reception of the coupled mobile machine configuration command automatically triggers a new self-measurement comprising the receiving of the position data signals, the determining of the geometric information for the coupled mobile machines and the outputting of the control signals based upon the determined geometric information.

3. The method of claim 1 further comprising receiving second position data signals that are based upon sensing of the coupled mobile machines in a second position in which the mobile machines have second orientations, different than the first orientations, relative to one another, wherein the geometric information for the coupled mobile machines is determined based upon both the first position data and the second position data.

4. The method of claim 1 further comprising:
   outputting control signals to direct repositioning of the coupled machines to a second position in which the couple machines have second orientations, different than the first orientations, relative to one another;
   receiving second position data signals that are based upon sensing of the coupled mobile machines in the second position, wherein the geometric information for the coupled mobile machines is determined based upon both the first position data and the second position data.

5. The method of claim 1 wherein the geometric information comprises a hitch-pivot point of coupling of the mobile machines.

6. The method of claim 1 further comprising:
   determining contact points of the coupled mobile machines based upon the determined geometric information for the coupled mobile machines; and
   monitoring a distance between the contact points of the coupled mobile machines, wherein the control signals are output in response to the distance between the contact points being less than a predefined buffer distance.

7. The apparatus of claim 6, wherein the method further comprises adjusting the predefined buffer distance based upon at least one of a current rate at which corresponding contact points of the coupled mobile machines of moving closer to one another and an environmental condition.

8. The method of claim 1 further comprising:
   determining contact points of the coupled mobile machines based upon the determined geometric information for the coupled mobile machines; and
   monitoring a distance between the contact points of the coupled mobile machines, wherein the control signals are output in response to the distance between the contact points being less than a predefined buffer distance, the control signals initiate an action selected from a group of action consisting of: output of a notification to an onboard operator of the coupled machines; output of a notification across a wireless network to a remote location; imposition of a steering limitation upon the coupled mobile machines; and stopping travel of the coupled mobile machines.

9. The method of claim 1, wherein the coupled mobile machines comprise a tractor and a towed implement.

10. The method of claim 1, wherein the coupled mobile machines comprise a winged machine having an adjustable transverse width, wherein the method further comprises receiving second position data signals based upon sensing of the coupled mobile machines in a second position in which the coupled mobile machines have second orientations, different than the first orientations, relative to one another, wherein the first position is with the winged machine in a first state having a first transverse width, wherein the second position is with the winged machine in a second state having a second transverse width, wherein the position data signals depend upon the first transverse width, wherein the second position data signals depend upon the second transverse width and wherein the geometric information for the coupled mobile machines is determined based upon both the position data signals and the second position data signals.

11. The method of claim 1 further comprising receiving user inputted data regarding at least one of the coupled mobile machines, wherein the control signals are output based upon both the user inputted data and the geometric information that was determined from first position data signals based upon sensing of coupled mobile.

12. The method of claim 1 further comprising retrieving stored second geometric information for a first one of the coupled mobile machines, wherein the position data signals are based upon sensing of a second one of the coupled mobile machines in the first position in which the first one of the coupled mobile machines has a first orientation relative to the second one of the coupled mobile machines and wherein the control signals are output based upon both the retrieved stored second geometric information and the geometric information that was determined from first position data signals.

13. The method of claim 1, wherein the coupled mobile machines comprise a plurality of monitoring devices and wherein the control signals select which of the monitoring devices are used to monitor operation of the coupled mobile machines based upon the determined geometric information.

14. The method of claim 1, wherein the coupled mobile machines comprise a plurality of monitoring devices at different locations and wherein the control signals select from which of the different locations operation of the coupled mobile machines is monitored based upon the determined geometric information.

15. The method of claim 1, wherein the coupled mobile machines comprise a plurality of different monitoring devices and wherein the control signals differently weight signals from the plurality of different monitoring devices during monitoring of operation of the coupled mobile machines based upon the determined geometric information.

16. The method of claim 1 further comprising receiving signals indicating an environmental condition, wherein the coupled mobile machines comprise a plurality of monitoring devices and wherein the control signals select which of the monitoring devices are used to monitor operation of the coupled mobile machines based upon both the signals indicating the environmental condition and the determined geometric information.

17. An apparatus comprising:
a non-transient computer-readable medium containing instructions to direct a processor to:
receive first position data signals that are based upon sensing of coupled mobile machines in a first predetermined position in which the coupled mobile machines have first orientations relative to one another;
determine geometric information for the coupled mobile machines from the received data signals; and
output control signals based upon the determined geometric information for the coupled mobile machines; and
receive second position data signals that are based upon sensing of the coupled mobile machines in a second predetermined position in which the mobile machines have second orientations, different than the first orientations, relative to one another, wherein the geometric information for the coupled mobile machines is determined based upon both the first position data signals, the first predetermined position, the second position data signals and the second predetermined position.

18. The apparatus of claim 17, wherein the instructions output control signals that control steering of at least one of the coupled mobile machines to automatically move the coupled mobile machines to the first predetermined position and the second predetermined position.

19. The apparatus of claim 17, wherein the instructions output control signals to instruct an operator to reposition the coupled mobile machines in the first predetermined position and the second predetermined position.

20. An apparatus comprising:
a first mobile machine;
a second mobile machine pivotably coupled to the first mobile machine;
a sensor to sense at least one of the first mobile machine and the second mobile machine; and
a controller to:
determine geometric information for the first mobile machine and the second mobile machine when coupled to one another; and
output control signals to facilitate monitoring and control of operations of the first mobile machine and the second mobile machine based upon the determined geometric information;
determine contact points of the first mobile machine with respect to the second mobile machine based upon the determined geometric information for the first mobile machine and the second mobile machine; and
monitor a distance between the contact points of the first mobile machine and the second mobile machine, wherein the control signals are output in response to the distance between the contact points being less than a predefined buffer distance, the control signals to initiate an action selected from a group of action consisting of: output of a notification to an onboard operator of the coupled machines; output of a notification across a wireless network to a remote location; imposition of a steering limitation upon the coupled mobile machines; and stopping travel of the coupled mobile machines.

21. The apparatus of claim 20, wherein the position data signals are based upon at least one of a number of tires employed by the coupled mobile machines, the size of the number of tires and the inflation state of the number of tires.

* * * * *